(12) United States Patent
Lin et al.

(10) Patent No.: US 9,506,291 B2
(45) Date of Patent: Nov. 29, 2016

(54) AUTOMATIC RESET DEVICE FOR CURTAIN PULL BAR

(71) Applicant: MACAUTO INDUSTRIAL CO., LTD., Tainan (TW)

(72) Inventors: Paul Lin, Tainan (TW); Hung-Ming Yen, Tainan (TW)

(73) Assignee: MACAUTO INDUSTRIAL CO., LTD. (TW)

( * ) Notice: Subject to any disclaimer, the term of this patent is extended or adjusted under 35 U.S.C. 154(b) by 1 day.

(21) Appl. No.: 14/624,567

(22) Filed: Feb. 17, 2015

(65) Prior Publication Data

US 2015/0259978 A1   Sep. 17, 2015

(30) Foreign Application Priority Data

Mar. 11, 2014  (TW) .............................. 103204098 U (51) Int. Cl.
| | |
|---|---|
| *B60J 3/00* | (2006.01) |
| *E06B 9/78* | (2006.01) |
| *B60J 1/20* | (2006.01) |
| *B60J 3/02* | (2006.01) |

(52) U.S. Cl.
CPC ................ *E06B 9/78* (2013.01); *B60J 1/2044* (2013.01); *B60J 3/02* (2013.01)

(58) Field of Classification Search
CPC .... B60J 1/2044; B60J 1/2047; B60J 1/2075; B60J 1/2083; B60J 1/2086; B60J 1/2066
USPC .................. 296/141, 143, 97.8; 160/370.22, 160/370.21, DIG. 2
See application file for complete search history.

(56) References Cited

U.S. PATENT DOCUMENTS

| | | | | |
|---|---|---|---|---|
| 2,015,848 | A * | 10/1935 | Hamm ................... | B60J 1/2044 160/281 |
| 2,802,524 | A * | 8/1957 | Peacock ................. | B60J 1/2011 160/323.1 |
| 4,335,773 | A * | 6/1982 | Masi ...................... | B60J 1/2041 160/120 |
| 4,869,542 | A * | 9/1989 | Lin ........................ | B60J 1/2047 160/370.22 |
| 5,089,912 | A * | 2/1992 | Simin .................... | B60J 1/2041 160/370.22 |
| 5,210,905 | A * | 5/1993 | Dietz ..................... | B60N 3/023 16/402 |
| 6,079,474 | A * | 6/2000 | Lin ........................ | B60J 1/205 160/262 |
| 6,109,330 | A * | 8/2000 | Crisp ..................... | B60J 1/2019 160/370.22 |

(Continued)

FOREIGN PATENT DOCUMENTS

| | | | | |
|---|---|---|---|---|
| FR | 2792030 | A1 * | 10/2000 | ............ B60J 1/2047 |
| FR | 3014763 | A1 * | 6/2015 | ............ B60J 1/2044 |

(Continued)

*Primary Examiner* — Katherine Mitchell
*Assistant Examiner* — Johnnie A Shablack
(74) *Attorney, Agent, or Firm* — Hershkovitz & Associates, PLLC; Abe Hershkovitz (57) ABSTRACT

An automatic reset device for curtain pull bar is fixed on a rod of a curtain fabric and comprises a fixed base, a pull bar having a handle, and a torsion-supplying element. One end of a rotation axis of the pull bar is located at the fixed base, and the pull bar can be rotated relative to the fixed base. The torsion-supplying element that preserves torsion is connected between the pull bar and the fixed base. When the curtain fabric is furled and the pull bar is released, the pull bar is automatically rotated and reset by the preserved torsion force of the torsion-supplying element. The handle of the pull bar will not collide with the door trim of a vehicle, and the abutting pressure forced against the door trim by the handle of the pull bar can be efficiently controlled.

10 Claims, 8 Drawing Sheets

(56) References Cited

U.S. PATENT DOCUMENTS

| | | | | |
|---|---|---|---|---|
| 6,125,908 A * | 10/2000 | Ament | | B60R 5/047 |
| | | | | 160/323.1 |
| 6,554,339 B1 * | 4/2003 | Moore | | B60R 7/005 |
| | | | | 280/749 |
| 6,840,562 B2 * | 1/2005 | Schlecht | | B60J 1/2019 |
| | | | | 160/265 |
| 7,314,079 B2 * | 1/2008 | Yano | | B60J 1/2027 |
| | | | | 160/265 |
| 7,343,646 B2 * | 3/2008 | Hayashi | | E05B 85/18 |
| | | | | 16/412 |
| 7,401,840 B2 * | 7/2008 | Schnoblen | | B60J 1/2044 |
| | | | | 160/370.22 |
| 7,475,935 B2 * | 1/2009 | Ercolano | | B60J 1/2038 |
| | | | | 296/146.7 |
| 7,594,684 B2 * | 9/2009 | Hidaka | | B60N 3/023 |
| | | | | 16/110.1 |
| 7,686,375 B1 * | 3/2010 | Schlotterer | | B60J 1/2019 |
| | | | | 160/370.22 |
| 8,061,757 B1 * | 11/2011 | Moore | | B60J 1/2019 |
| | | | | 160/370.22 |
| 8,167,349 B1 * | 5/2012 | Cha | | B60R 5/047 |
| | | | | 160/370.22 |
| 8,286,307 B2 * | 10/2012 | Cheng | | G06F 1/1616 |
| | | | | 16/303 |
| 8,307,516 B2 * | 11/2012 | Bartnick | | B60N 3/023 |
| | | | | 16/110.1 |
| 8,646,828 B2 * | 2/2014 | Haase | | B60J 1/2041 |
| | | | | 296/146.1 |
| 8,777,302 B2 * | 7/2014 | Kanai | | B60J 3/02 |
| | | | | 160/262 |
| 8,978,309 B2 * | 3/2015 | Goto | | E06B 9/42 |
| | | | | 160/370.22 |
| 9,132,718 B2 * | 9/2015 | Starzmann | | B60J 1/2022 |
| 2002/0020039 A1 * | 2/2002 | Spurr | | E05B 85/12 |
| | | | | 16/412 |
| 2005/0121943 A1 * | 6/2005 | Neaux | | B60J 7/0015 |
| | | | | 296/146.16 |
| 2005/0140181 A1 * | 6/2005 | Katada | | B60J 7/0015 |
| | | | | 296/214 |
| 2007/0029058 A1 * | 2/2007 | Lin | | B60J 1/2047 |
| | | | | 160/370.22 |
| 2007/0068638 A1 * | 3/2007 | Puskarz | | B60J 1/2086 |
| | | | | 160/370.22 |
| 2008/0098563 A1 * | 5/2008 | Lee | | B60N 3/023 |
| | | | | 16/110.1 |
| 2009/0205792 A1 * | 8/2009 | Brendel | | B60J 1/2044 |
| | | | | 160/370.22 |
| 2012/0267465 A1 * | 10/2012 | Kitani | | B60J 7/0015 |
| | | | | 242/376 |
| 2014/0138981 A1 * | 5/2014 | Lin | | B60J 1/2038 |
| | | | | 296/97.4 |
| 2015/0259978 A1 * | 9/2015 | Lin | | B60J 3/02 |
| | | | | 160/370.22 |
| 2016/0031297 A1 * | 2/2016 | Maier | | B60J 3/0226 |
| | | | | 296/97.4 |
| 2016/0062413 A1 * | 3/2016 | Sano | | G06F 1/166 |
| | | | | 361/679.09 |

FOREIGN PATENT DOCUMENTS

| | | | | | |
|---|---|---|---|---|---|
| JP | | EP 2722207 A1 * | 4/2014 | | B60J 7/0015 |
| JP | DE 102014109814 | * | 1/2015 | | B60J 1/2044 |

* cited by examiner

AUTOMATIC RESET DEVICE FOR CURTAIN PULL BAR

BACKGROUND OF THE INVENTION

1. Field of the Invention

The present invention relates to an automatic reset device, especially for a curtain pull bar of a vehicle's side window.

2. Description of the Prior Arts

To avoid direct sunlight exposure of the interior of the vehicle, curtains are usually added to the vehicle's side windows. Numerous curtains of the prior art for vehicle's side windows are provided on demand. In the numerous curtains for the vehicle's side windows, the roll control device of the embedded curtain is embedded into the door trim of the vehicle's side door. After the embedded curtain is furled, only the pull bar located at the open end of the curtain fabric is exposed to the door trim. As a result, the curtain can be less disturbing to people in the vehicle and provide more aesthetic appeal.

When the above embedded curtain used in the vehicle's side door is expanded by pulling up the pull bar of the open end of the curtain fabric, the pull bar is hooked by a positioning element located at the upper edge of the the vehicle's side window, such that the curtain fabric will not be furled by the roll control device. When the curtain fabric is going to furl, the pull bar is detached from the positioning element, and the curtain fabric is pulled down and furled by the roll control device. When the pull bar is following the curtain fabric down to the door trim of the vehicle's side door, the pull bar contacts the top edge of the door trim. The other end of the pull bar automatically abuts the surface of the door trim by the lever principle.

The position of the pull bar, indeed, requires no adjustment by the above structure, i.e. the pull bar automatically abuts the surface of the door trim by the lever principle. However, the pull bar structure can only be used in a hard-shell door trim. For a soft-shell door trim, the top edge of the door trim repeatedly contacted and over-pressed by the handle of the pull bar will gradually lead to depression of the door trim, thereby affecting the appearance of the door trim.

Therefore, the disadvantages in the prior arts should be resolved.

SUMMARY OF THE INVENTION

According to the above description, the present invention provides an automatic reset device for curtain pull bar to solve the depression problem of the door trim that the soft-shell door trim is repeatedly pressed and collided by the handle of the pull bar of the vehicle curtain.

To achieve the above purpose, the present invention provides an automatic reset device for curtain pull bar, the automatic reset device fixed on a rod of a curtain fabric and comprising:

a fixed base;

a pull bar comprising a rotation shaft and a handle located at the rotation shaft, wherein an end of the rotation shaft is located at an end of the fixed base, and the pull bar is rotatable relative to the fixed base;

a torsion-supplying element preserving the torsion, connected between the pull bar and the fixed base, and providing force for rotatably resetting the pull bar.

The automatic reset device for curtain pull bar of the present invention is used for vehicle curtains. When the curtain fabric is going to furl, the pull bar is detached and automatically reset by the torsion-supplying element that preserves the torsion force. After the handle of the pull bar is pressed against the door trim, the pull bar still obtains moderate torsion force by the torsion-supplying element because the handle of the pull bar can moderately abut the soft-shell door trim. As a result, the handle of the pull bar will not make noise by colliding with the door trim or damage the door trim during shakes or vibrations of the vehicle driven on uneven terrains. Meanwhile, the abutting pressure forced against the door trim by the handle of the pull bar can be efficiently controlled by the automatic reset device for curtain pull bar, and the depression problem that the top edge of the door trim is over-pressed by the handle of the pull bar can be efficiently avoided, such that the aesthetic appeal of the surface of the door trim can be maintained.

The automatic reset device for curtain pull bar of the present invention can further provide an angular displacement limiting structure for limiting the resetting rotational angle, together with the torsion force provided by the torsion-supplying element forced to the pull bar to control the reset position of the pull bar and the abutting pressure forced on the door trim by the handle of the pull bar.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
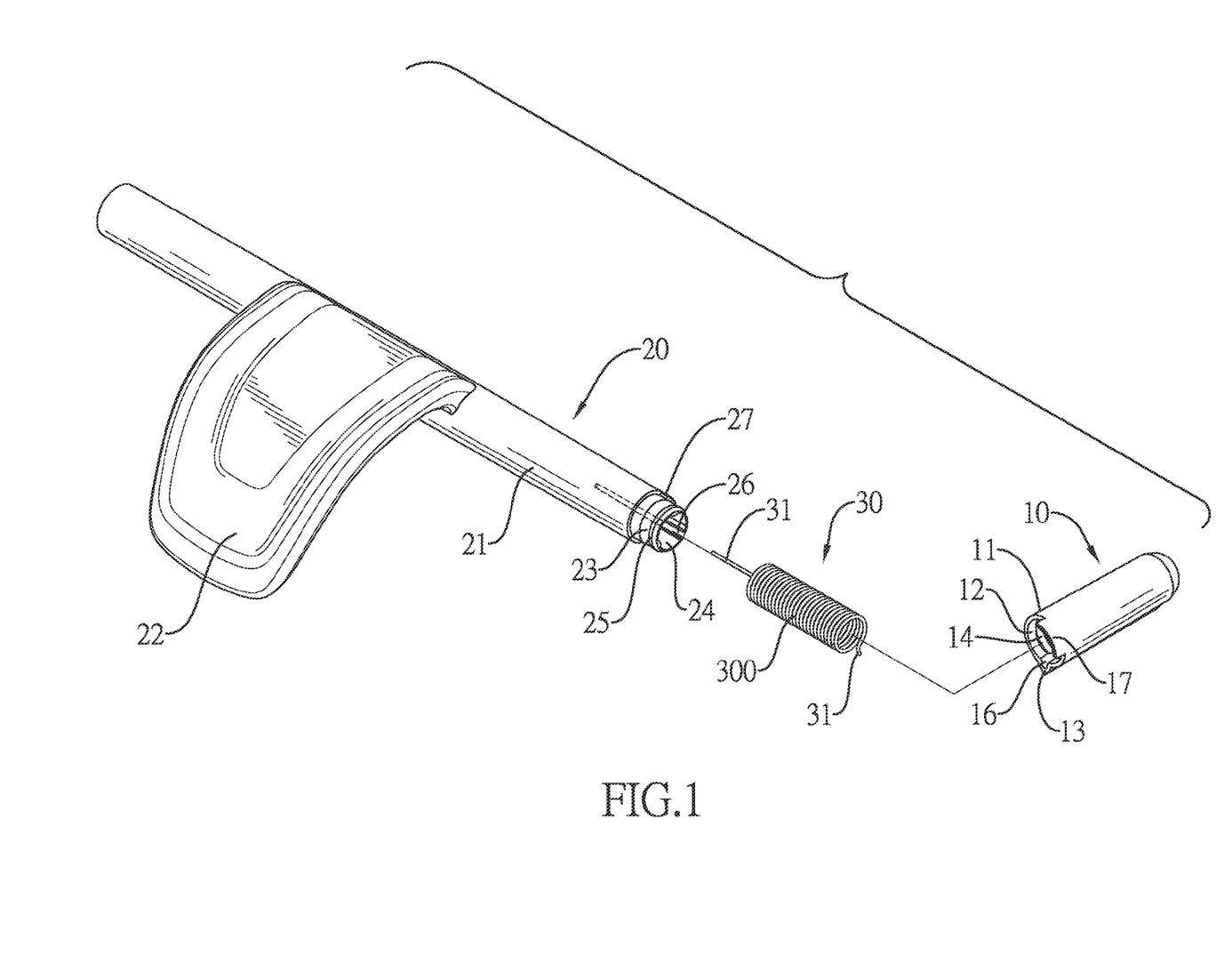
FIG. 1 is an exploded view of the first preferred embodiment of the automatic reset device for curtain pull bar of the present invention.
Figure 2:
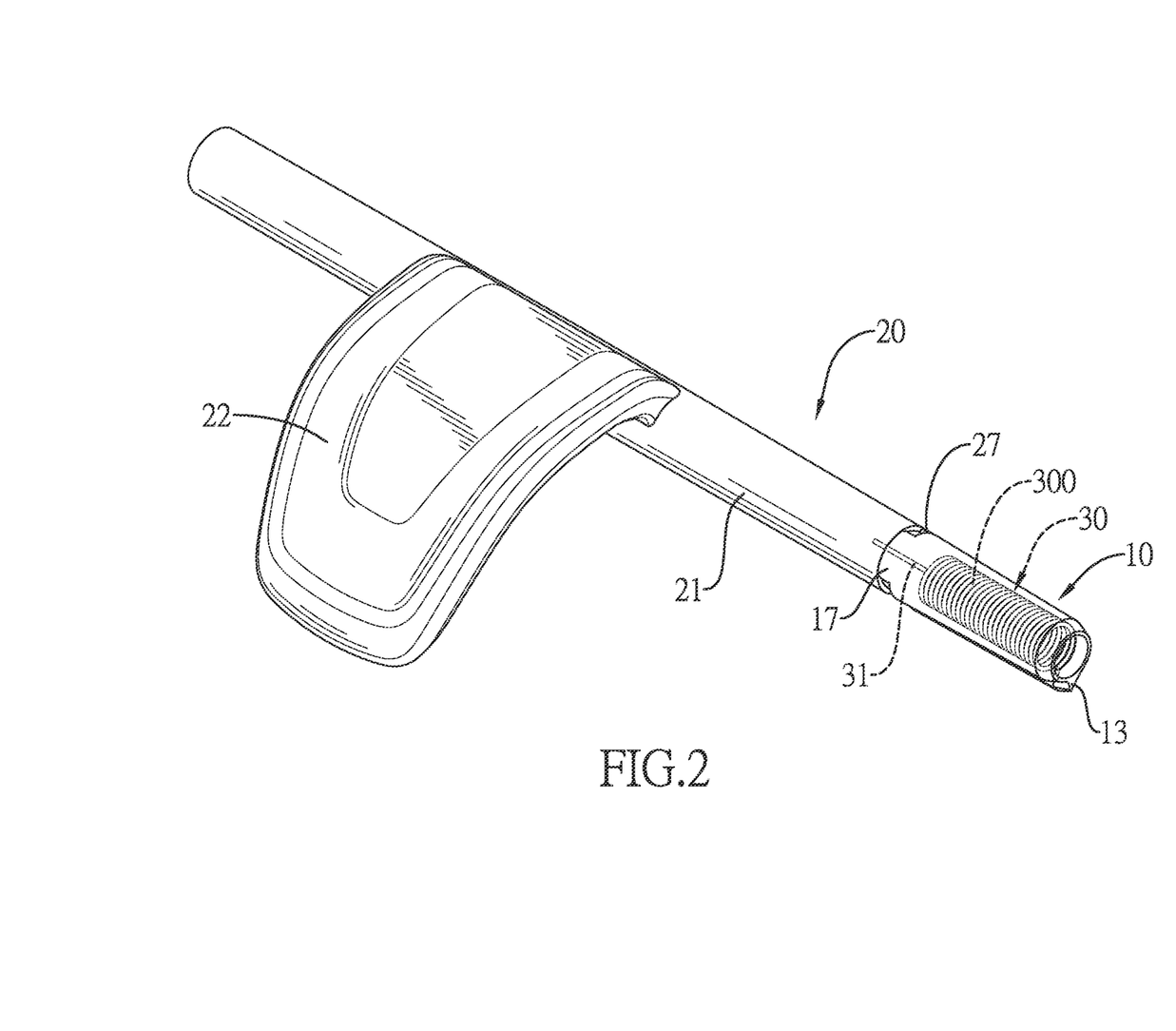
FIG. 2 is a perspective view of the first preferred embodiment of the automatic reset device for curtain pull bar in FIG. 1.
Figure 5:
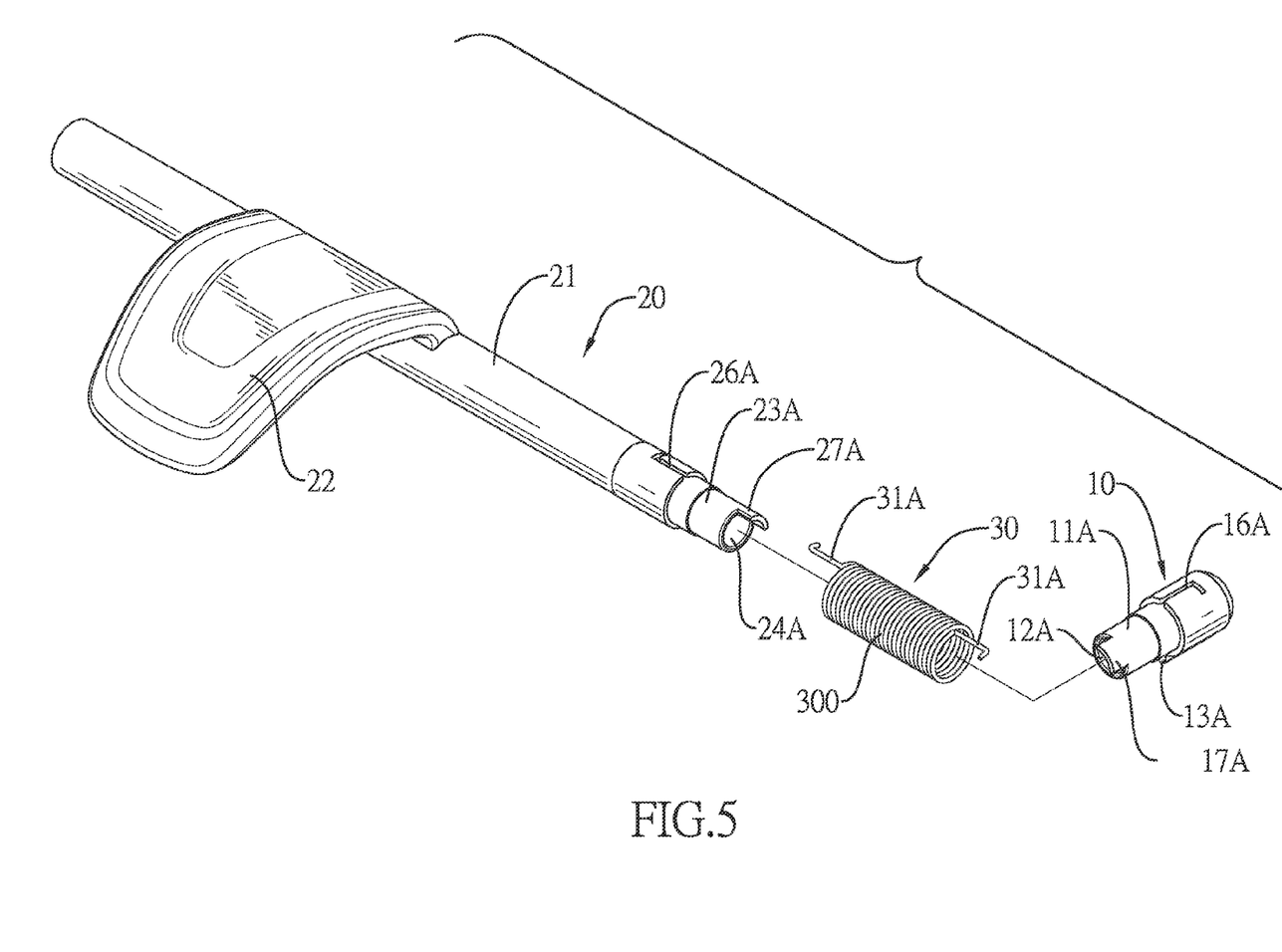
FIG. 5 is an exploded view of the second preferred embodiment of the automatic reset device for curtain pull bar of the present invention.
Figure 6:
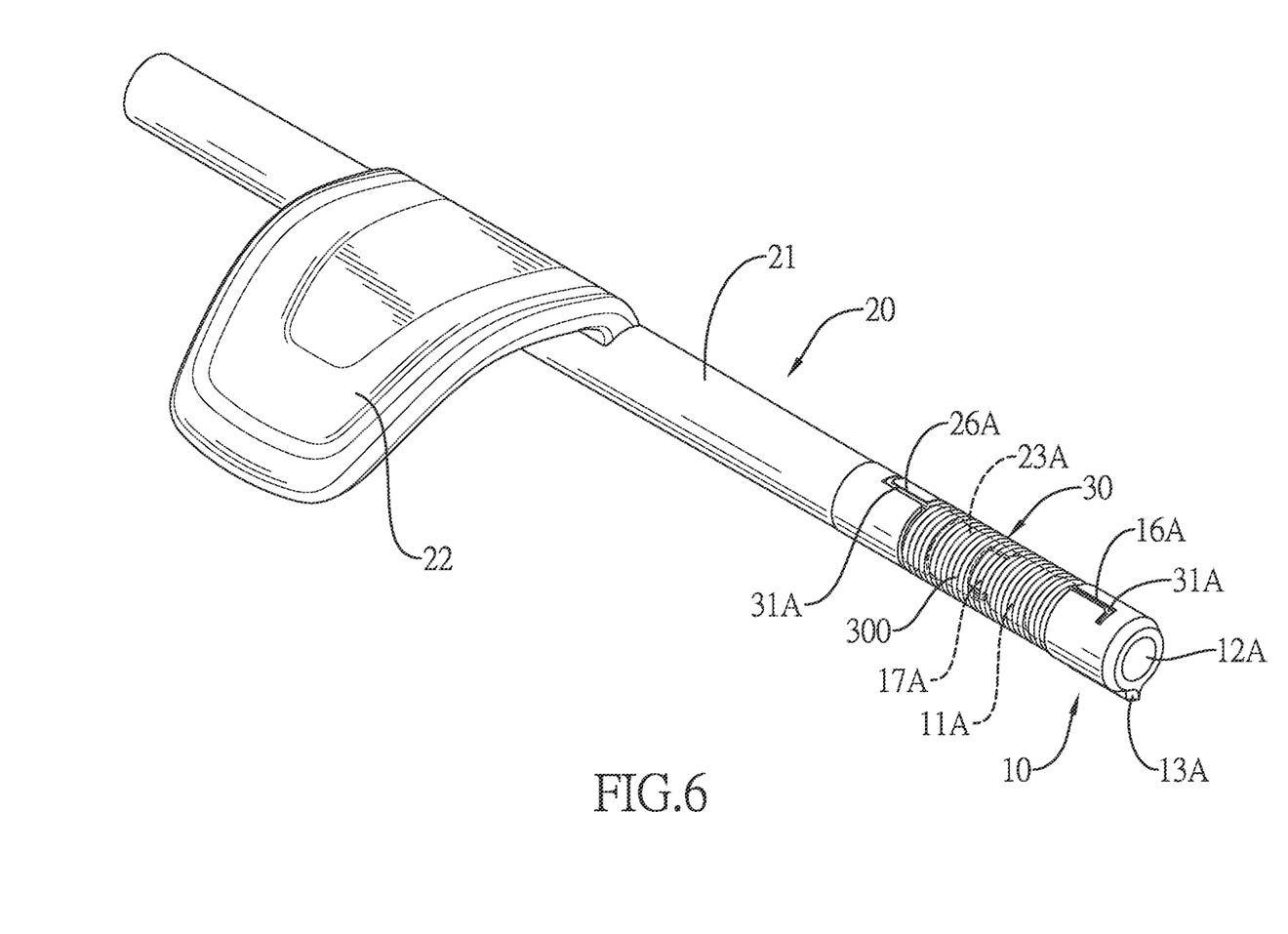
FIG. 6 is a perspective view of the second preferred embodiment of the automatic reset device for curtain pull bar in FIG. 5.

As shown in FIGS. 1 and 5, an automatic reset device for curtain pull bar of the present invention provides multiple preferred embodiments, wherein the automatic reset device for curtain pull bar comprises a fixed base 10, a pull bar 20, and a torsion-supplying element 30.

As shown in FIG. 1 or 5, the fixed base 10 comprises an engaging end 11 located at an end of the fixed base 10. The pull bar 20 comprises a rotation shaft 21 and a handle 22 located at the rotation shaft 21. Preferably, the handle 22 is located at the middle of the rotation shaft 21. A connecting end 23, 23A is located at an end of the rotation shaft 21. The connecting end 23, 23A of the rotation shaft 21 of the pull bar 20 is disposed toward the engaging end 11, 11A of the fixed base 10, and the pull bar 20 can rotate relative to the fixed base 10. The torsion-supplying element 30 preserving the torsion is connected between the connecting end 23, 23A of the pull bar 20 and the engaging end 11, 11A of the fixed base 10, and forces the pull bar 20 to reset rotatably.

The torsion-supplying element 30 is a torsional spring 300 or any other resilient element that can provide torsion. In a preferred embodiment as shown in FIG. 1 or 5, the torsion-supplying element 30 is a torsional spring 300 which preserves the torsion by being pre-twisted to a preset angle, and two ends of the torsional spring 300 are respectively connected to the engaging end 11, 11A of the fixed base 10 and the connecting end 23, 23A of the pull bar 20. A range of the pre-set angle of the torsional spring 300 is determined by the required torsion force for driving the pull bar 20 to rotate for the pre-set angle. In a preferred embodiment, the torsional spring 300 is pre-twisted by one to two circles for preserving the torsion.

As previously mentioned, the two ends of the torsional spring 300 are tightly mounted at the engaging end 11,11A of the fixed base 10 and the connecting end 23, 23A of the pull bar 20 respectively, or two positioning strips 31, 31A of the two ends of the torsional spring 300 respectively abut the engaging end 11, 11A of the fixed base 10 and the connecting end 23, 23A of the pull bar 20.

Figure 3:
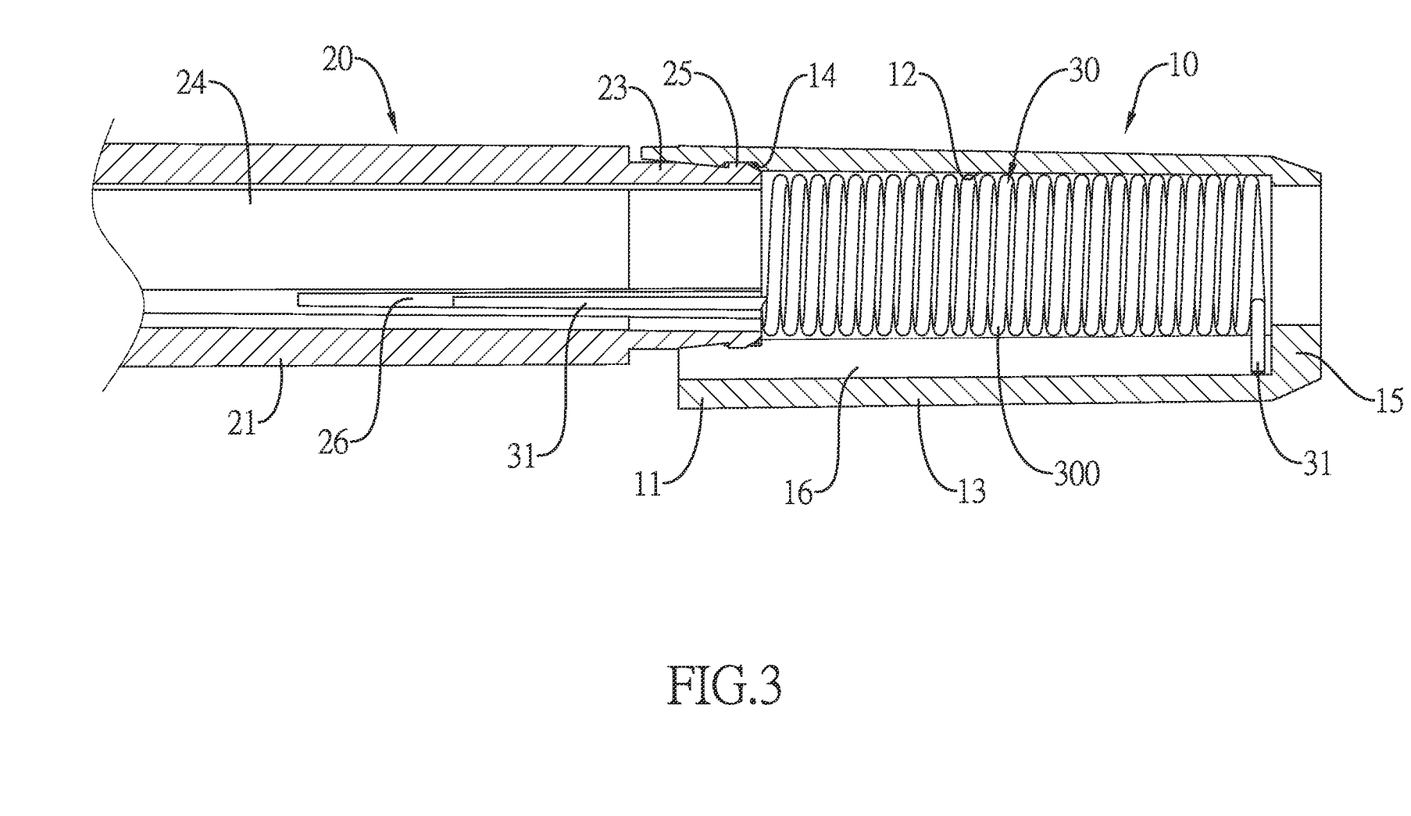
FIG. 3 is a cross-sectional view of the first preferred embodiment of the automatic reset device for curtain pull bar in FIG. 1.
Figure 8:
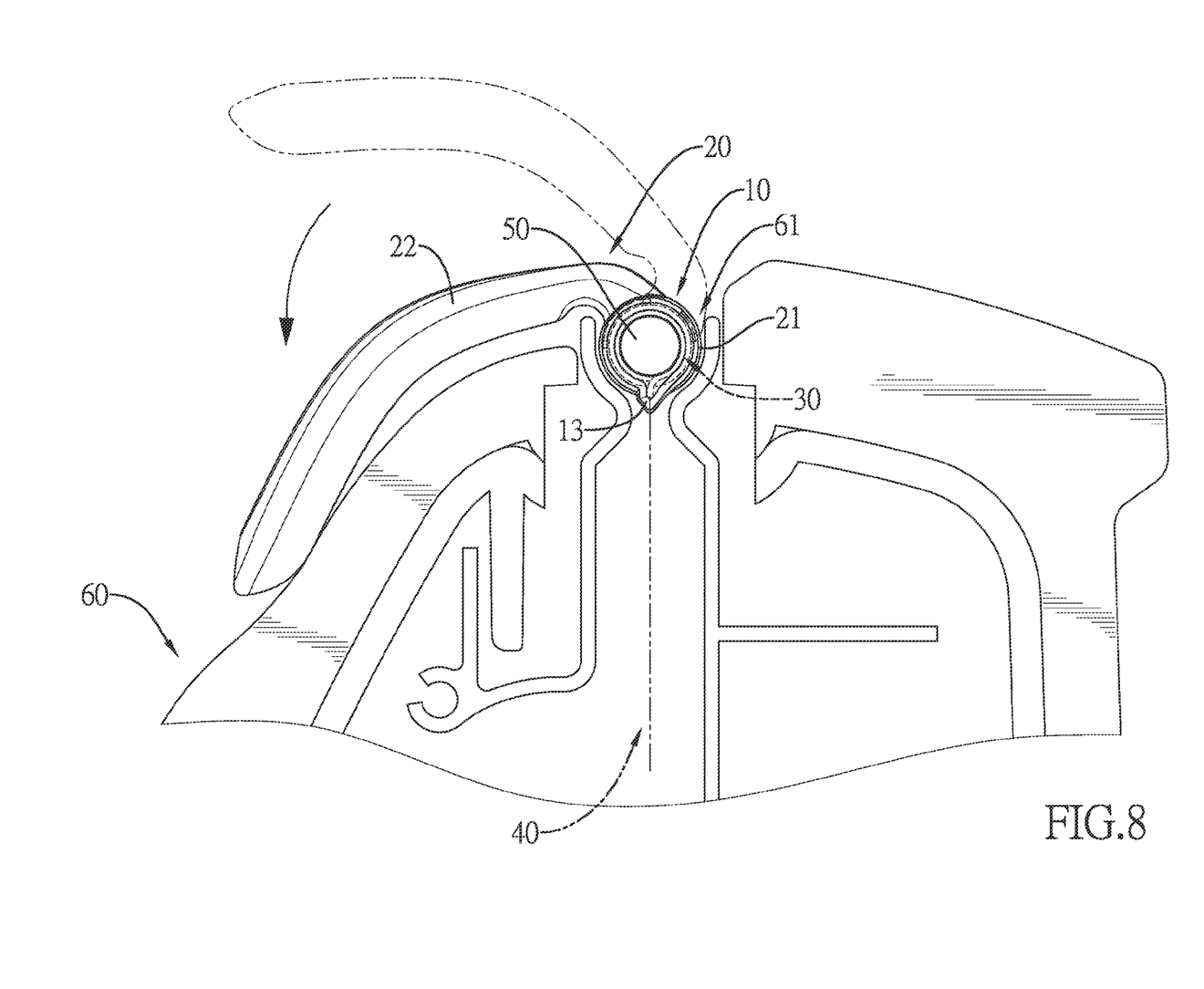
FIG. 8 illustrates an operational view of the automatic reset device for curtain pull bar in FIG. 1 with curtain fabric and rod for use in the vehicle's door trim.

As shown in FIGS. 1 to 4, the present invention provides a first preferred embodiment of the automatic reset device for a curtain pull bar. In the first preferred embodiment, the connecting end 23 of the rotation shaft 21 of the pull bar 20 is enclosed by the engaging end 11 of the fixed base 10. The torsion-supplying element 30 is the torsional spring 300 fixed in the engaging end 11 of the fixed base 10 and the connecting end 23 of the pull bar 20. As shown in FIGS. 1, 3, and 8, the fixed base 10 is a tube-shaped element having a circular through-hole 12 formed axially through the fixed base 10, and a rod 50 of a curtain fabric 40 is fixed through the through-hole 12. A positioning protrusion 13 protrudes from an outer peripheral surface of the fixed base 10. The fixed base 10 comprises a limiting annular groove 14 formed in a hole wall of the through-hole 12 proximal to the engaging end 11, and the fixed base 10 comprises an abutment portion 15 formed in the hole wall opposite the engaging end 11. The pull bar 20 comprises an axial hole 24 formed axially through the rotation shaft 21 of the pull bar 20, and the rod 50 connected to the curtain fabric 40 can be inserted through the axial hole 24, such that the pull bar 20 can be rotated on the rod 50, and the connecting end 23 of the rotation shaft 21 is rotatably fixed in the through-hole 12 of the fixed base 10. An annular flange 25 is formed on an outer peripheral surface of the connecting end 23. As shown in FIG. 3, the annular flange 25 is correspondingly inserted into the limiting annular groove 14 of the fixed base 10, such that the rotation shaft 21 of the pull bar 20 is firmly pivoted on the fixed base 10.

As shown in FIG. 1, in the first preferred embodiment, the torsional spring 300 is fixed in the through-hole 12 of the fixed base 10 and the axial hole 24 of the rotation shaft 21 of the pull bar 20, and the two ends of the torsional spring 300 tightly abut the fixed base 10 and the rotation shaft 21 of the pull bar 20 respectively. In a preferred embodiment, as shown in FIGS. 1 and 3, a positioning recess 16 is formed in the fixed base 10 at a site corresponding to the positioning protrusion 13; a positioning groove 26 is recessed on a hole wall of the axial hole 24 of the rotation shaft 21 of the pull bar 20; the two positioning strips 31 formed on the two ends of the torsional spring 300 are respectively located at the positioning recess 16 of the fixed base 10 and the positioning groove 26 of the pull bar 20.

As shown in FIGS. 5 to 8, the present invention provides a second preferred embodiment of the automatic reset device for a curtain pull bar. In the second preferred embodiment, the connecting end 23A of the rotation shaft 21 is connected to the engaging end 11A of the fixed base 10; the torsion-supplying element 30 is a torsional spring 300, and an exterior of the engaging end 11A of the fixed base 10 and an outer peripheral surface of the connecting end 23A of the rotation shaft 21 are enclosed by the torsional spring 300. The fixed base 10 is a tube-shaped element having the circular through-hole 12A formed axially through the fixed base 10, and the rod 50 of the curtain fabric 40 is fixed through the through-hole 12A. The rotation shaft 21 of the pull bar 20 has an axial hole 24A formed axially through the rotation shaft 21, and the rod 50 of the curtain fabric 40 can go through the axial hole 24A, such that the pull bar 20 can be rotated on the rod 50.

As shown in FIG. 5, the engaging end 11A of the fixed base 10 and the outer peripheral surface of the connecting end 23A of the rotation shaft 21 are enclosed by the torsional spring 300. The two ends of the torsional spring 300 tightly abut the engaging end 11A of the fixed base 10 and the connecting end 23A of the rotation shaft 21 of the pull bar 20 respectively. In the second preferred embodiment as shown in FIG. 5, the positioning recess 16A formed in an L shaped is formed on an outer peripheral surface of the engaging end 11A of the fixed base 10; the L-shaped positioning groove 26A is formed on the outer peripheral surface of the connecting end 23A of the rotation shaft 21 of the pull bar 20; two positioning strips 31A formed L-shaped respectively on the two ends of the torsional spring 300 are respectively inserted and positioned in the positioning recess 16A of the fixed base 10 and the positioning groove 26A of the pull bar 20, such that the torsional spring 300 is respectively connected to the fixed base 10 and the pull bar 20.

Further, the automatic reset device for curtain pull bar of the present invention provides an angular displacement limiting structure located between the pull bar 20 and the fixed base 10 for limiting the resetting rotational angle of the pull bar 20, and for forcing the torsion force provided by the torsion-supplying element 30 to the pull bar 20 to control the reset position of the pull bar 20.

Figure 4:
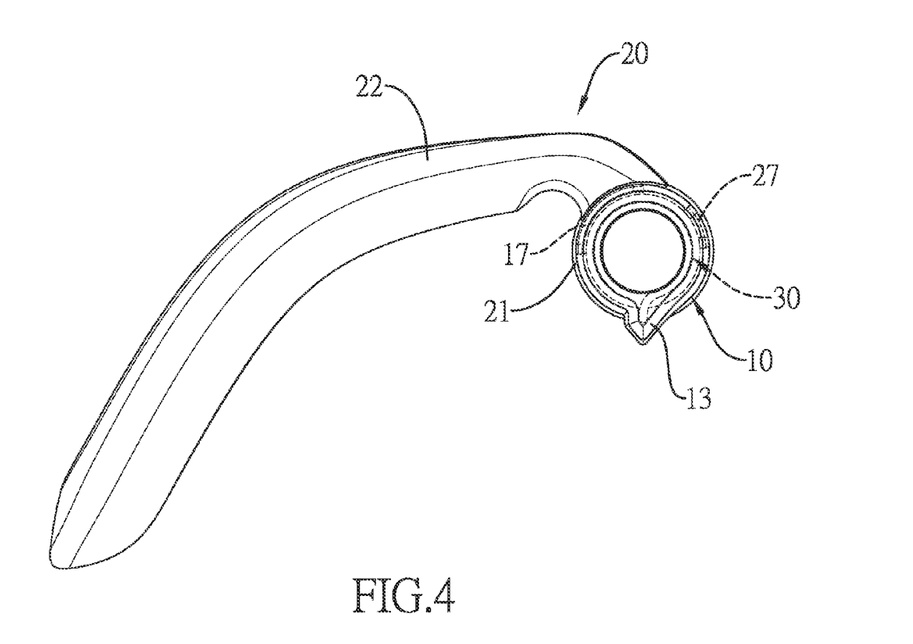
FIG. 4 is a side view of the first preferred embodiment of the automatic reset device for curtain pull bar in FIG. 1.

As shown in FIGS. 1 and 4, in the first preferred embodiment, a first limiting protrusion 17 protrudes from an outer end portion of the engaging end 11 of the fixed base 10; the rotation shaft 21 of the pull bar 20 comprises a second limiting protrusion 27 protruding from the outer peripheral surface of the connecting end 23. The outer peripheral surface of the connecting end 23 of the rotation shaft 21 of the pull bar 20 is enclosed by the fixed base 10. When the pull bar 20 is rotated relative to the fixed base 10, a rotational angle is controlled by the angular displacement limiting structure, which is the first limiting protrusion 17 and the second limiting protrusion 27, for limiting the reset rotational angle of the pull bar 20.

Figure 7:
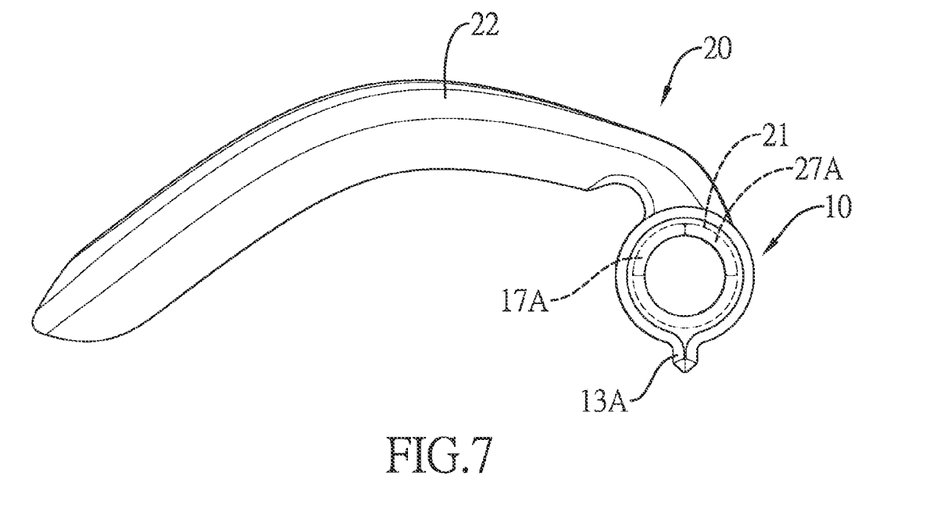
FIG. 7 is a side view of the second preferred embodiment of the automatic reset device for curtain pull bar in FIG. 5.

As shown in FIGS. 5 and 7, in the second preferred embodiment, the first limiting protrusion 17A protrudes from an outer end portion of the engaging end 11A of the fixed base 10; the rotation shaft 21 of the pull bar 20 comprises the second limiting protrusion 27A protruding from an outer end of the connecting end 23A. The connecting end 23A of the rotation shaft 21 of the pull bar 20 is connected to the engaging end 11A of the fixed base 10. The first limiting protrusion 17A and the second limiting protrusion 27A are offset in location. When the pull bar 20 is rotated relative to the fixed base 10, a rotational angle is controlled by the angular displacement limiting structure, which is the first limiting protrusion 17A and the second limiting protrusion 27A, for limiting the reset rotational angle of the pull bar 20.

When the automatic reset device for a curtain pull bar of the present invention is used for a curtain, for example, the embedded curtain for use in the side window of a vehicle as shown in FIG. 8, a roll control device of the embedded curtain is embedded in a door trim 60 of the vehicle's side door, and the door trim 60 has an elongate groove 61. The rod 50 is connected to the curtain fabric 40 extending beyond a free end of the elongate groove 61 of the door trim 60. The automatic reset device for a curtain pull bar of the present invention is fixed on the rod 50 enclosed by the fixed base 10, and the curtain fabric 40 is stuck on the fixed base 10 by an adhesive layer of the outer peripheral surface of the fixed base 10. The rotation shaft 21 of the pull bar 20 can be rotatably mounted at the rod 50, and the torsion-supplying element 30 preserving the torsion is connected between the pull bar 20 and the fixed base 10. The torsion is adjusted depending on test results, such that the torsional force for resetting the pull bar 20 can be controlled to an optimal situation.

When the automatic reset device for curtain pull bar of the present invention is in use, the curtain fabric 40 can be pulled and expanded from the door trim 60 of the vehicle's side door by the pull bar 20. When the curtain fabric 40 is extended to a predetermined position, the pull bar 20 is hooked by a positioning element located at the upper edge of the vehicle's side window, such that the curtain fabric 40 will not be furled by the roll control device. When the curtain fabric 40 is going to furl, the pull bar 20 is detached from the positioning element, and the curtain fabric 40 is pulled down and furled by the roll control device. The rod 50 located at the curtain fabric 40 is moved onto the door trim 60 of the vehicle's side door for releasing the pull bar 20.

After the pull bar 20 is released, the positioning protrusion 13 protruding from the outer peripheral surface of the fixed base 10 is inserted into the elongate groove 61 of the door trim 60 for positioning, so the rod 50 of the curtain fabric 40 is unrotatable. The pull bar 20 is automatically and rotatably reset down to the door trim 60 by the torsion-supplying element 30 that preserves the torsion. After the handle 22 of the pull bar 20 is pressed against the door trim 60, the pull bar 20 still obtains moderate torsion force by the torsion-supplying element 30, or by the torsion-supplying element 30 in cooperation with the angular displacement limiting structure located between the pull bar 20 and the fixed base 10. The reset rotational angle of the pull bar 20 is limited to control the position of the handle 22 of the pull bar 20 and the abutting pressure forced against the door trim 60 by the handle 22. As a result, the handle 22 of the pull bar 20 will not make noise by colliding on the door trim 60 or damage the door trim 60 during shakes or vibrations of the vehicle driven on uneven terrains. On the other hand, the abutting pressure forced against the door trim 60 by the handle 22 of the pull bar 20 can be efficiently controlled by the automatic reset device for curtain pull bar, and the depression problem that the top edge of the door trim 60 is over-pressed by the handle 22 of the pull bar 20 can be efficiently avoided, such that the aesthetic appeal of the surface of the door trim 60 can be maintained.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An automatic reset device for a curtain pull bar, the automatic reset device fixed on a rod and comprising:
   a fixed base;
   a pull bar comprising a rotation shaft and a handle located at the rotation shaft, wherein an end of the rotation shaft is located at an end of the fixed base, and the pull bar is rotatable relative to the fixed base;
   a torsion-supplying element preserving the torsion force, connected between the pull bar and the fixed base, and providing force for rotatably resetting the pull bar;
   wherein said end of the fixed base is an engaging end, and the fixed base has a through-hole formed axially through the fixed base;
   said end of the rotation shaft of the pull bar is a connecting end; the rotation shaft has an axial hole formed axially through the rotation shaft the connecting end of the rotation shaft is rotatably fixed in the through-hole of the fixed base; and
   the torsion-supplying element is a torsional spring fixed in the through-hole of the fixed base and the axial hole of the rotation shaft, and two ends of the torsional spring are respectively connected to the fixed base and the rotation shaft of the pull bar.

2. The automatic reset device for a curtain pull bar according to claim 1, wherein a first limiting protrusion protrudes from an outer end portion of the engaging end of the fixed base; a second limiting protrusion protrudes from an outer peripheral surface of the connecting end of the pull bar; the outer peripheral surface of the connecting end of the rotation shaft of the pull bar is enclosed by the fixed base, and a rotational angle of the pull bar is limited by the first limiting protrusion relative to the second limiting protrusion.

3. The automatic reset device for a curtain pull bar according to claim 2, wherein a limiting annular groove is formed in a hole wall of the through-hole of the engaging end; an annular flange formed on the outer peripheral surface of the connecting end is correspondingly inserted into the limiting annular groove, such that the rotation shaft of the pull bar is pivoted on the fixed base.

4. The automatic reset device for a curtain pull bar according to claim 1, wherein a positioning protrusion protrudes from an outer peripheral surface of the fixed base and forms a positioning recess in an inner peripheral surface of the fixed base at a site corresponding to the positioning protrusion; a positioning groove is recessed on a hole wall of the axial hole of the pull bar; two positioning strips formed on the two ends of the torsional spring are respectively located at the fixed base and the rotation shaft of the pull bar, and the two positioning strips are respectively inserted into the positioning recess of the fixed base and the positioning groove of the pull bar.

5. The automatic reset device for a curtain pull bar according to claim 4, wherein a first limiting protrusion protrudes from an outer end portion of the engaging end of the fixed base; a second limiting protrusion protrudes from an outer peripheral surface of the connecting end of the pull bar; the outer peripheral surface of the connecting end of the rotation shaft of the pull bar is enclosed by the fixed base, and a rotational angle of the pull bar is limited by the first limiting protrusion relative to the second limiting protrusion.

6. The automatic reset device for a curtain pull bar according to claim 5, wherein a limiting annular groove is formed in a hole wall of the through-hole of the engaging end; and an annular flange formed on the outer peripheral surface of the connecting end is correspondingly inserted into the limiting annular groove, such that the rotation shaft of the pull bar is pivoted on the fixed base.

7. An automatic reset device for a curtain pull bar, the automatic reset device fixed on a rod and comprising:
   a fixed base;
   a pull bar comprising a rotation shaft and a handle located at the rotation shaft, wherein an end of the rotation shaft is located at an end of the fixed base, and the pull bar is rotatable relative to the fixed base; and
   a torsion-supplying element preserving the torsion force, connected between the pull bar and the fixed base, and providing a force for rotatably resetting the pull bar;
   wherein said end of the fixed base is an engaging end, and the fixed base has a through-hole formed axially through the fixed base;
   said end of the rotational shaft of the pull bar is a connecting end; the rotation shaft has an axial hole formed axially through the rotation shaft; the connecting end of the rotation shaft is connected to the engaging end of the fixed base; and
   the torsion-supplying element is a torsional spring, and the engaging end of the fixed base and an outer peripheral surface of the connecting end of the rotation shaft are enclosed by the torsional spring;
   wherein the rod is fixed through the through-hole and is inserted through the axial hole, and the rod is enclosed by the fixed base and the pull bar.

8. The automatic reset device for a curtain pull bar according to claim 7, wherein an L-shaped positioning recess is formed on an outer peripheral surface of the engaging end of the fixed base; an L-shaped positioning groove is formed on the outer peripheral surface of the connecting end of the rotation shaft; two L-shaped positioning strips respectively formed on two ends of the torsional spring are respectively inserted and positioned in the positioning recess of the fixed base and the positioning groove of the pull bar.

9. The automatic reset device for a curtain pull bar according to claim 8, wherein a positioning protrusion protrudes from an outer peripheral surface of the fixed base.

10. The automatic reset device for a curtain pull bar according to claim 8, wherein a first limiting protrusion protrudes from an outer end portion of the engaging end of the fixed base; a second limiting protrusion protrudes from the outer peripheral surface of the connecting end of the rotation shaft of the pull bar; the connecting end of the rotation shaft is connected to the engaging end of the fixed base, and a rotational angle of the pull bar is limited by the first limiting protrusion relative to the second limiting protrusion.

* * * * *